(12) United States Patent
Kim (10) Patent No.: US 9,714,692 B2
(45) Date of Patent: Jul. 25, 2017

(54) POWER TRAIN OF AUTOMATIC TRANSMISSION

(71) Applicant: HYUNDAI POWERTECH CO., LTD, Chungcheongnam-do (KR)

(72) Inventor: Cheol Jin Kim, Gyeonggi-do (KR)

(73) Assignee: HYUNDAI POWERTECH CO., LTD., Chungcheongnam-Do (KR)

( * ) Notice: Subject to any disclaimer, the term of this patent is extended or adjusted under 35 U.S.C. 154(b) by 76 days.

(21) Appl. No.: 14/439,588

(22) PCT Filed: Feb. 18, 2013

(86) PCT No.: PCT/KR2013/001248
§ 371 (c)(1),
(2) Date: Apr. 29, 2015

(87) PCT Pub. No.: WO2014/069721
PCT Pub. Date: May 8, 2014

(65) Prior Publication Data
US 2015/0276021 A1    Oct. 1, 2015

(30) Foreign Application Priority Data

Oct. 31, 2012    (KR) .......................... 10-2012-0122123

(51) Int. Cl.
*F16H 3/66* (2006.01)
*F16H 3/44* (2006.01)

(52) U.S. Cl.
CPC .............. *F16H 3/666* (2013.01); *F16H 3/66* (2013.01); *F16H 3/663* (2013.01); *F16H 2003/442* (2013.01); *F16H 2200/0065* (2013.01); *F16H 2200/201* (2013.01); *F16H 2200/202* (2013.01); *F16H 2200/2007* (2013.01); *F16H 2200/2048* (2013.01); *F16H 2200/2082* (2013.01)

(58) Field of Classification Search
CPC .... F16H 2003/442; F16H 3/663; F16H 3/666; F16H 2200/2007
See application file for complete search history.

(56) References Cited

U.S. PATENT DOCUMENTS 7,442,145 B2 * 10/2008 Raghavan ............... F16H 3/663
                                                    475/286
7,878,938 B2 *  2/2011 Choi ...................... F16H 3/663
                                                    475/275
(Continued)

FOREIGN PATENT DOCUMENTS

JP        10-311386 A      11/1998
JP        2008-286294 A    11/2008
(Continued)

OTHER PUBLICATIONS

International Search Report in International Application No. PCT/KR2013/001248, filed Feb. 18, 2013.

*Primary Examiner* — Sherry Estremsky
(74) *Attorney, Agent, or Firm* — Saliwanchik, Lloyd & Eisenschenk (57) ABSTRACT

The present invention relates to a power train of an automatic transmission, which includes seven rotating elements configured through two planetary gear sets, and selectively fastens three rotating elements through four clutches and three brakes, thereby providing nine forward speeds and one reverse speed.

2 Claims, 8 Drawing Sheets

(56) References Cited

U.S. PATENT DOCUMENTS

| | | | | |
|---|---|---|---|---|
| 8,343,007 | B2* | 1/2013 | Hart | F16H 3/66 475/288 |
| 8,419,585 | B2* | 4/2013 | Wittkopp | F16H 3/666 475/269 |
| 9,182,013 | B2* | 11/2015 | Gumpoltsberger | F16H 3/66 |
| 2015/0267785 | A1* | 9/2015 | Hart | F16H 3/66 475/277 |

FOREIGN PATENT DOCUMENTS

| | | |
|---|---|---|
| JP | 2009-174643 A | 8/2009 |
| KR | 10-0644482 B1 | 11/2006 |
| KR | 10-2008-0105540 A | 12/2008 |

\* cited by examiner

POWER TRAIN OF AUTOMATIC TRANSMISSION

CROSS-REFERENCE TO RELATED APPLICATIONS

This application is the U.S. national stage application of international Patent Application No. PCT/KR2013/001248, filed Feb. 18, 2013, which claims priority to Korean Application No. 10-2012-0122123, filed Oct. 31, 2012, the disclosures of each of which are incorporated herein by reference in their entirety.

TECHNICAL FIELD

The present invention relates to a power train of an automatic transmission, and more particularly, to a power train of an automatic transmission, which includes seven rotating elements configured through two planetary gear sets including an input and output, and selectively fastens three rotating elements through four clutches and three brakes, thereby providing nine forward speeds and one reverse speed.

BACKGROUND ART

In general, an automatic transmission refers to a transmission which automatically changes speed according to a traveling speed, and can perform optimal torque conversion without a clutch. The automatic transmission may be implemented with a combination of a torque converter and a planetary gear.

Currently, 6-8 speed automatic transmissions have been frequently adopted and applied instead of conventional 3-4 speed automatic transmissions, in order to improve fuel efficiency. Furthermore, the automobile industry has conducted much research to develop 9-10 speed automatic transmissions. By around 2013, the 9-10 speed automatic transmissions are expected to be commonly used.

However, as the number of speed stages is increased, the number of parts and the weight of the multi-speed automatic transmission are also inevitably increased. Thus, the automatic transmission has difficulties in improving fuel efficiency. That is, when the weight of the automatic transmission is increased, the effect of the improvement in fuel efficiency may be offset even though the multi-speed structure is applied.

DISCLOSURE

Technical Problem

Embodiments of the present invention are directed to a power train of an automatic transmission, which includes seven rotating elements configured through two planetary gear sets, and selectively fastens three rotating elements through four clutches and three brakes, thereby providing nine forward speeds and one reverse speed.

Technical Solution

In an embodiment, a power train of an automatic transmission may include: a first planetary gear set 100 including three rotating elements which are successively rotationally connected to each other, wherein a first rotating element 110 at an outer side is connected to an input shaft IN at all times, and second and third elements 120 and 130 are controlled through brakes B1 and B2 and clutches C1 and C2, respectively; and a second planetary gear set 200 including first to fourth rotating elements 210 to 240 which are rotationally connected to each other, wherein a first rotating element 210 at an outer side is connected to the input shaft IN through a clutch C3, a second rotating element 220 is connected to an output shaft OUT at all times, a third rotating element 230 is controlled through a brake B3 and a clutch C4, and a fourth rotating element 240 is connected through the clutches C1 and C2.

The first planetary gear set 100 may include a single or double pinion planetary gear.

The second planetary gear set 200 may include a Ravigneaux planetary gear, a two-simple planetary gear, a Simpson planetary gear, or a stacked planetary gear in which two planetary gears are combined.

Advantageous Effects

According to the embodiment of the invention, the power train of the automatic transmission can reduce the number of elements required for providing nine forward speeds and one reverse speed, thereby reducing the weight, the cost and the number of parts. Furthermore, since the power train has a compact structure, the mountability thereof can be improved. Furthermore, the performance of the power train can be improved through a multi-speed configuration, and the efficiency of the automatic transmission can be improved.

DESCRIPTION OF DRAWINGS

The above and other aspects, features and advantages of the invention will become apparent from the following detailed description in conjunction with the accompanying drawings, in which.

BEST MODE

Embodiments of the invention will hereinafter be described in detail with reference to the accompanying drawings. The terms used in this specification and claims must not be limited to typical or lexical meanings, and analyzed into meanings and concepts which coincide with the technical idea of the present invention under the principle that the inventor can properly define the concepts of the terms in order to describe the invention through the best method.

Therefore, the embodiments described in this specification and the structures illustrated in the drawings are only examples, and may include all of variations, equivalents, and substitutes within the scope of the present invention.

(Construction)

The present invention relates to a power train of an automatic transmission, which includes seven rotating elements through two planetary gears. Among the rotating elements, three rotating elements may be selectively fastened through three brakes and four brakes so as to provide forward nine speeds and one reverse speed.

In particular, any one of the planetary gear sets may use a single pinion planet gear or double pinion planetary gear, and the other one may use a Ravigneaux planetary gear, a Simpson planetary gear, a two simple planetary gear, or a stacked planetary gear in which two planetary gears are combined.

Hereafter, the power train of the automatic transmission will be described in more detail with reference to embodiments.

[First Embodiment]

Figure 1:
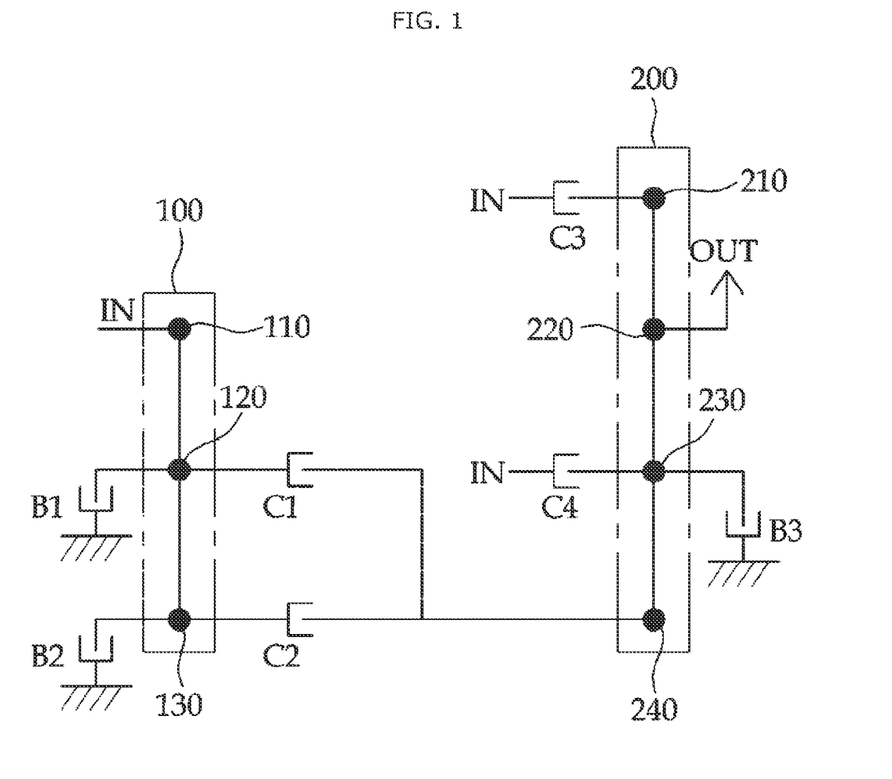
FIG. 1 schematically illustrates the structure of a power train in accordance with a first embodiment of the present invention.

As illustrated in FIG. 1, a power train in accordance with a first embodiment of the present invention may include a first planetary gear set 100 and a second planetary gear set 200. At this time, the first and second planetary gear sets 100 and 200 may be selectively connected and controlled through three brakes B1 to B3 and four clutches C1 to C4.

The first planetary gear set 100 may include three rotating elements, that is, first to third rotating elements 110 and 130 which are engaged with each other. In particularly, the first rotating element 110 at an outer side may be connected to an input shaft IN at all times. At this time, "outer" may indicate a sun gear of the planetary gear as the fastest component.

The power transmission and interruption of the second and third rotating elements 120 and 130 may be controlled through the brakes B1 and B2 and the clutches C1 and C2, respectively. The second and third rotating elements 120 and 130 may correspond to a carrier and a ring gear of a planetary gear.

Furthermore, the power transmitted through the clutches C1 and C2 may be transmitted to the second planetary gear set 200 which will be described below.

The second planetary gear set 200 may include first to fourth rotating elements 210 to 240. The first rotating element 210 at an outer side may be directly connected to the input shaft IN through the clutch C3. Furthermore, the fourth rotating element 240 at the other outer side may be connected to the first planetary gear set 100 through the clutches C1 and C2.

Between the outer sides, the second and third rotating elements 220 and 230 may be installed. The second rotating element 220 may be directly connected to an output shaft OUT. Furthermore, the power of the third rotating element 230 may be selectively controlled through the brake B3 and the clutch C4.

As depicted in Table 1 below, the power train in accordance with the embodiment of the present invention may exhibit gear speed stages of nine forward speeds and one reverse speed through the operations of the clutches C1 to C4 and the brakes B1 to B3 according to a speed map illustrated in FIG. 2.

TABLE 1

| Speed stage | Clutch | | | | Brake | | |
|---|---|---|---|---|---|---|---|
| | C1 | C2 | C3 | C4 | B1 | B2 | B3 |
| 1 | | ○ | | | ○ | | ○ |
| 2 | | ○ | ○ | | | | ○ |
| 3 | | ○ | ○ | | ○ | | |
| 4 | ● | ◆ | ○ | | ● | ◆ | |
| 5 | ○ | | ○ | | | ○ | |
| 6 | ○ | | ○ | ○ | | | |
| 7 | ○ | | | ○ | | ○ | |
| 8 | ● | ◆ | | ○ | ● | ◆ | |
| 9 | | ○ | | ○ | ○ | | |
| R | ○ | | | | | ○ | ○ |

◆ and ● represent that the same shapes are coupled to form a speed stage.

Figure 2:
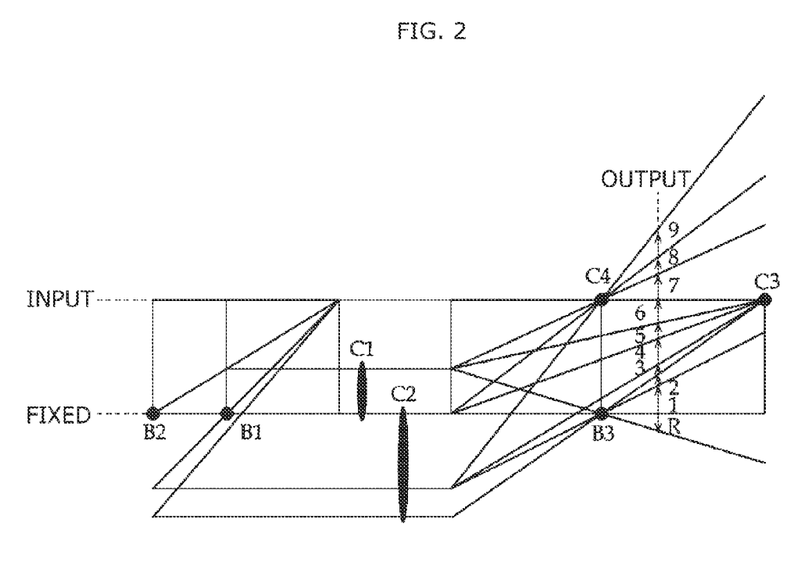
FIG. 2 illustrates a speed map based on the operation of the power train in accordance with the first embodiment of the present invention.
Figure 3:
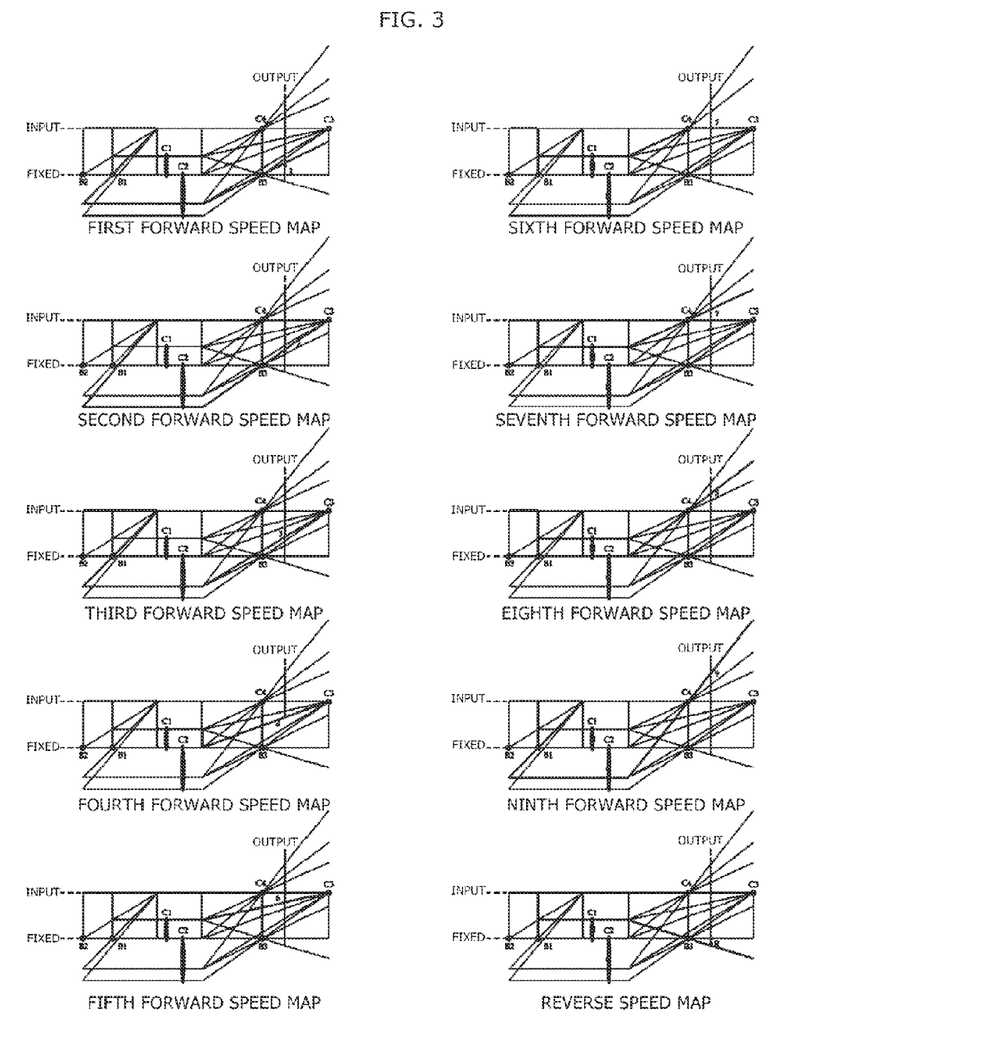
FIG. 3 illustrates speed maps of forward nine speeds and one reverse speed which are provided by the power train in accordance with the first embodiment of the present invention.

FIG. 3 illustrates speed maps which are changed through the control of the clutches C1 to C4 and the brakes B1 to B3 according to FIG. 2 and Table 1. As illustrated in FIG. 3, the power train in accordance with the embodiment of the present invention can exhibit speed stages of nine forward speeds and one reverse speed. In FIG. 3, a change in a speed map may be indicated by a heavy line, and speed stages of nine forward speeds and one reverse speed may be performed through the clutches C1 to C4 and the brakes B1 to B3 in the speed maps.

In the embodiment of the present invention, it has been described that the second planetary gear set is a stacked planetary gear. However, although a Ravigneaux planetary gear, a Simpson planetary gear, or a two simple planetary gear is applied, the same effect can be obtained.

[Second Embodiment]

In a second embodiment of the present invention, the same components as those of the first embodiment are represented by like reference numerals, and the detailed descriptions thereof are omitted herein.

Figure 4:
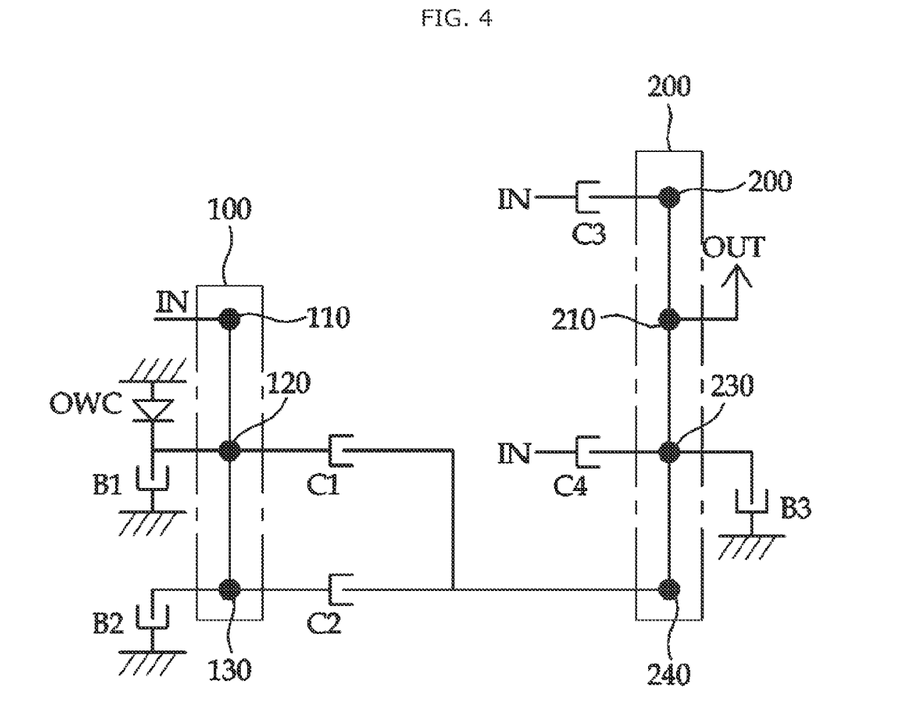
FIG. 4 schematically illustrates the structure of a power train in accordance with a second embodiment of the present invention.

As illustrated in FIG. 4A, the power train in accordance with the second embodiment of the present invention may further include a one-way clutch OWC which is provided at an inner rotating element forming the first planetary gear set 100, that is, the second rotating element 120.

In particular, the one-way clutch OWC may control the second rotating element 120 at the first speed stage as depicted in Table 2 below, thereby preventing a slip at starting.

TABLE 2

| Speed stage | Clutch | | | | Brake | | | |
|---|---|---|---|---|---|---|---|---|
| | C1 | C2 | C3 | C4 | B1 | B2 | B3 | OWC |
| 1 | | ○ | ○ | | ○ | | | ○ |
| 2 | | ○ | ○ | | | | ○ | |
| 3 | | ○ | | | ○ | | ○ | |
| 4 | ● | ◆ | ○ | | ● | ◆ | | |
| 5 | ○ | | ○ | | | ○ | | |
| 6 | ○ | | ○ | ○ | | | | |
| 7 | ○ | | | ○ | | ○ | | |
| 8 | ● | ◆ | | ○ | ● | ◆ | | |
| 9 | | ○ | | ○ | ○ | | | |
| R | ○ | | | | | ○ | ○ | |

◆ and ● represent that the same shapes are coupled to form a gear shift stage.

Figure 5:
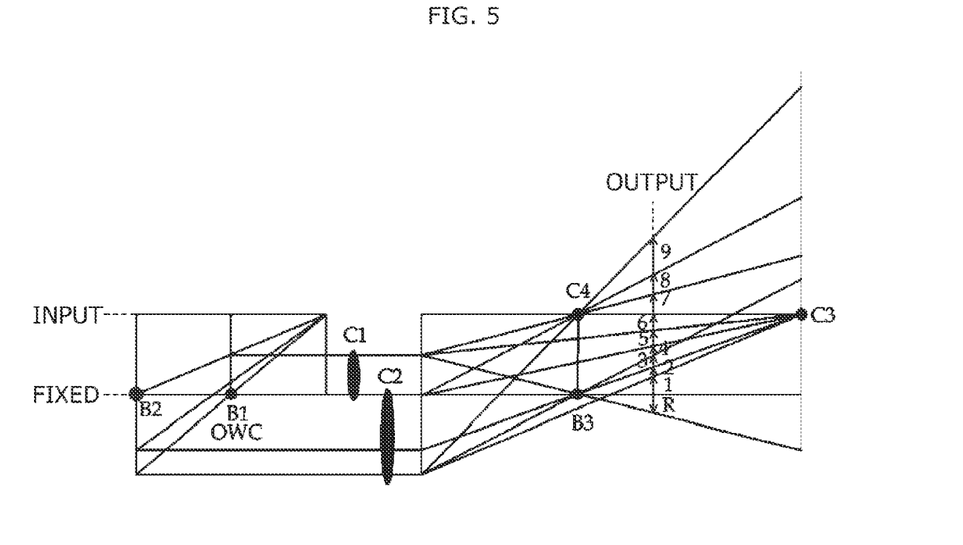
FIG. 5 illustrates a speed map based on the operation of the power train in accordance with the second embodiment of the present invention.

FIG. 5 illustrates a speed map which is obtained when the clutches C1 to C4, the brakes B1 to B3, and the one-way clutch OWC are operated as depicted in Table 2. As depicted in Tables 1 and 2, the speed stages of the second embodiment may be performed in the same manner as the first embodiment, except for the first to third speed stages. FIG.

Figure 6:
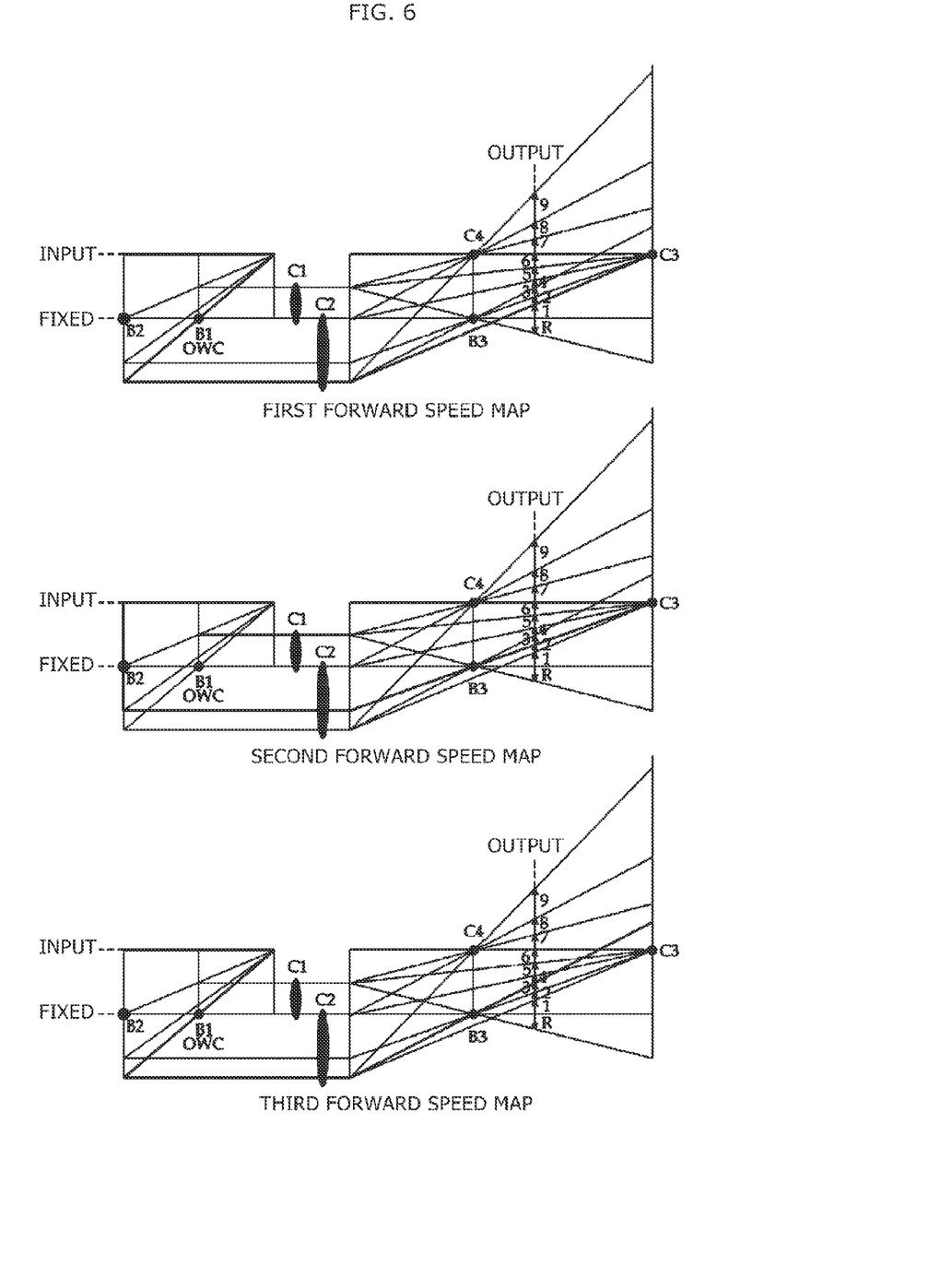
FIG. 6 illustrates speed maps of first to third forward speeds in the power train in accordance with the second embodiment of the present invention.

6 illustrates speed maps of the different speed stages from those of the first embodiment.

[Third Embodiment]

Figure 7:
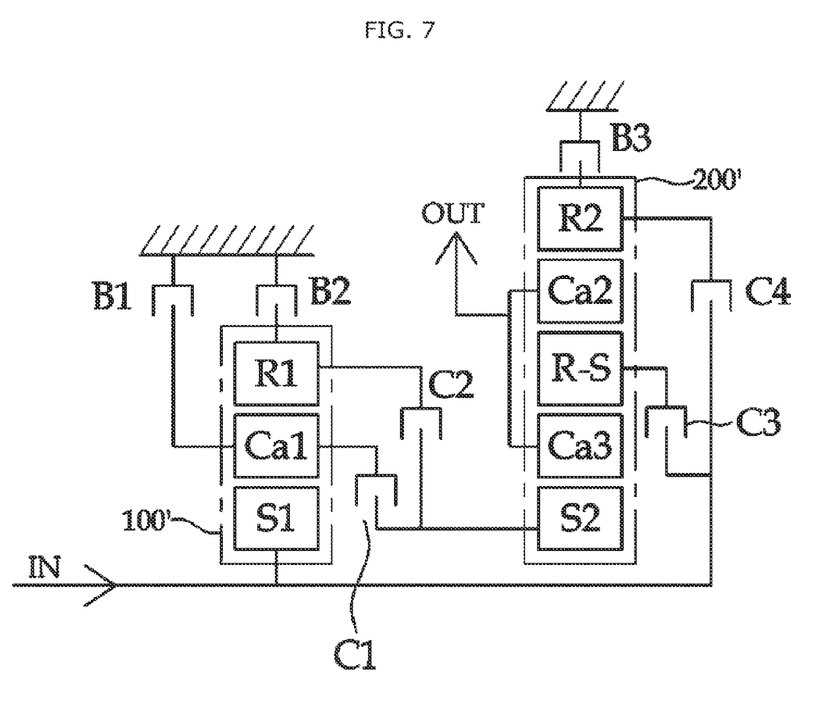
FIG. 7 schematically illustrates the structure of a power train in accordance with a third embodiment of the present invention.

As illustrated in FIG. 7, a power train in accordance with a third embodiment of the present invention may include a single pinion planetary gear 100' replacing the first planetary gear set and a stacked planetary gear 200' replacing the second planetary gear set, as a planetary gear set.

The single pinion planetary gear 100' may include three rotating elements, that is, a sun gear S1, a ring gear R1, and a carrier Ca1, as a single planetary gear. At this time, the sun gear S1 may be connected to the input shaft IN.

The power transmission and interruption of the ring gear R1 and the carrier Ca1 may be controlled through the brakes B1 and B2 and the clutches C1 and C2, respectively. At this time, the brakes B1 and B2 and the clutches C1 and C2 may control the ring gear R1 and the carrier Ca1 such that the same operation as the above-described first embodiment can be performed.

The stacked planetary gear 200' may have a structure in which a pair of single planetary gears are stacked, and have four rotating elements. Substantially, the stacked planetary gear 200' may include six rotating elements because the pair of planetary gears are provided. Among the rotating elements, however, a pair of carriers Ca2 and Ca3 may be rotated at the same time, and a ring-sun gear R-S including any one ring gear and any one sun gear may be operated at the same time. The carrier may serve to fix a plurality of planetary gears. The ring-sun gear R-S may selectively receive power from the input shaft IN through the clutch C3.

The pair of carriers Ca2 and Ca3 may be rotated together as described above. The output shaft OUT may be connected to the carriers Ca2 and Ca3, and the carriers Ca2 and Ca3 may be engaged with the ring-sun gear R-S.

Furthermore, the carrier Ca2 may be engaged with the ring gear R2. The power transmission and interruption of the ring gear R2 may be controlled through the brake B3 and the clutch C4. The clutch C4 may control the ring gear R2 to transmit power from the input shaft IN or interrupt power from the input shaft IN.

The other carrier Ca3 may be engaged with the sun gear 52. At this time, the sun gear 52 may receive power through the clutches C1 and C2 of the single pinion planetary gear 100'.

The power train in accordance with the third embodiment of the present invention may be configured in substantially the same manner as the first embodiment, and provide nine forward speeds and one reverse speed according to the speed map thereof.

[Fourth Embodiment]

Figure 8:
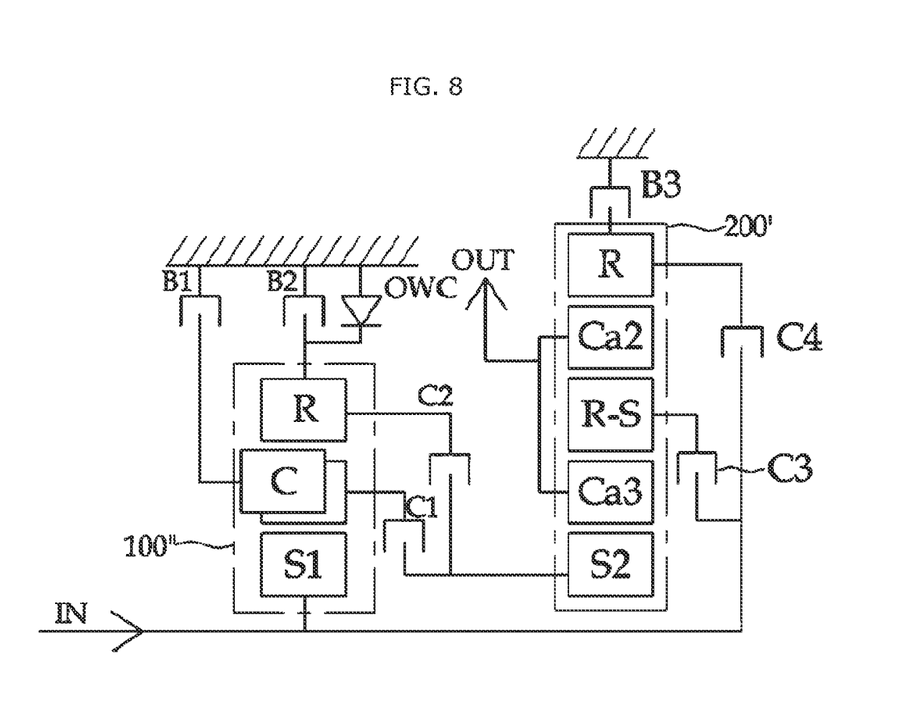
FIG. 8 schematically illustrates the structure of a power train in accordance with a fourth embodiment of the present invention.

As illustrated in FIG. 8, a power train in accordance with a fourth embodiment of the present invention may include a double pinion planetary gear 100" and a stacked planetary gear 200. Since the stacked planetary gear 200' has the same structure as that of the third embodiment, the detailed descriptions thereof are omitted herein.

The double pinion planetary gear 100" may include a carrier C, a sun gear S1, and a ring gear R. Since the sun gear S1 has the same structure as that of the third embodiment, the detailed descriptions thereof are omitted herein.

The ring gear R may be configured in the same manner as the third embodiment. The power train in accordance with the fourth embodiment may further include a one-way clutch OWC to prevent a slip at starting.

The power train may include a pair of carriers C. As described with reference to the third embodiment, the carriers C may transmit an output to the stacked planetary gear 200 while being selectively controlled through the clutch C1. The carriers C may have the same structure as those of the above-described embodiment, except that the carriers C are provided as the pair of carriers. Thus, the detailed descriptions thereof are omitted herein.

In the fourth embodiment of the present invention, it has been described that the stacked planetary gear 200' is used. However, although a Ravigneaux planetary gear, a Simpson planetary gear, or a two simple planetary gear is applied, the same effect can be obtained.

As described above, the power train in accordance with the embodiments of the present invention include seven rotating elements configured through two planetary gear sets, and operate three rotating elements using three brakes and four clutches, thereby providing nine forward speeds and one reverse speed.

The invention claimed is:

1. A power train of an automatic transmission, comprising:
a first planetary gear set (100) comprising three rotating elements that are successively rotationally connected to each other, wherein a first rotating element (110) at an outer side is connected to an input shaft (IN) at all times, and second and third rotating elements (120) and (130) are controlled through a first brake (B1) and a second brake (B2) and a first clutch (C1) and a second clutch (C2), respectively; and
a second planetary gear set (200) comprising fourth to seventh rotating elements (210) to (240) that are rotationally connected to each other, wherein the fourth rotating element (210) at an outer side is connected to the input shaft (IN) through the third clutch (C3), the fifth rotating element (220) is connected to an output shaft (OUT) at all times, the sixth rotating element (230) is controlled through a third brake (B3) and a fourth clutch (C4), and the seventh rotating element (240) is connected to the first and second clutches (C1) and (C2);
wherein a one-way clutch (OWC) is connected to one or more of the second and third rotating elements (120) and (130), and
wherein the first to fourth clutches (C1) to (C4), the first to third brakes (B1) to (B3), and the one-way clutch (OWC) in the power train of the automatic transmission are operated according to the following table:

| Speed | Clutch | | | | Brake | | | |
|---|---|---|---|---|---|---|---|---|
| stage | (C1) | (C2) | (C3) | (C4) | (B1) | (B2) | (B3) | (OWC) |
| 1 | | ○ | ○ | | | | | ○ |
| 2 | | ○ | ○ | | | ○ | | |
| 3 | | ○ | ○ | | ○ | | | |
| 4 | ● | ♦ | ○ | | ● | ♦ | | |
| 5 | ○ | | ○ | | | ○ | | |
| 6 | ○ | | ○ | ○ | | | | |
| 7 | ○ | | | ○ | | | ○ | |
| 8 | ● | ♦ | | ○ | ● | ♦ | | |
| 9 | | ○ | | ○ | ○ | | | |
| R | ○ | | | | | ○ | ○ | | wherein ♦ and ● represent that the same shapes are coupled to form a speed stage.

2. A power train of an automatic transmission, comprising:
a first planetary gear set (100) comprising three rotating elements that are successively rotationally connected to each other, wherein a first rotating element (110) at an outer side is connected to an input shaft (IN) at all times, and second and third rotating elements (120) and (130) are controlled through a first brake (B1) and a second brake (B2) and a first clutch (Cl) and a second clutch (C2), respectively; and a second planetary gear set (200) comprising fourth to seventh rotating elements (210) to (240) that are rotationally connected to each other, wherein the fourth rotating element (210) at an outer side is connected to the input shaft (IN) through a third clutch (C3), a fifth rotating element (220) is connected to an output shaft (OUT) at all times, a sixth rotating element (230) is controlled through a third brake (B3) and a fourth clutch (C4), and the seventh rotating element (240) is connected to the first and second clutches (C1) and (C2);

wherein the first planetary gear set (100) comprises a single or double pinion planetary gear, and the second planetary gear set (200) comprises a Ravigneaux planetary gear, a two-simple planetary gear, a Simpson planetary gear, or a stacked planetary gear in which two planetary gears are combined;

wherein a one-way clutch (OWC) is connected to one or more of the second and third rotating elements (120) and (130), and wherein the first to fourth clutches (C1) to (C4), the first to third brakes (B1) to (B3), and the one-way clutch (OWC) in the power train of the automatic transmission are operated according to the following table:

| Speed stage | Clutch | | | | Brake | | | |
| --- | --- | --- | --- | --- | --- | --- | --- | --- |
| | (C1) | (C2) | (C3) | (C4) | (B1) | (B2) | (B3) | (OWC) |
| 1 | | ○ | ○ | | ○ | | | ○ |
| 2 | | ○ | ○ | | | ○ | | |
| 3 | | ○ | | | ○ | ○ | | |
| 4 | ● | ♦ | ○ | | ● | ♦ | | |
| 5 | ○ | | ○ | | | ○ | | |
| 6 | ○ | | ○ | ○ | | | | |
| 7 | ○ | | | ○ | | ○ | | |
| 8 | ● | ♦ | | ○ | ● | ♦ | | |
| 9 | | ○ | | ○ | ○ | | | |
| R | ○ | | | | | ○ | ○ | | wherein ♦ and ● represent that the same shapes are coupled to form a speed stage.

* * * * *